United States Patent [19]

Bodwell et al.

[11] Patent Number: 5,288,407

[45] Date of Patent: Feb. 22, 1994

[54] DENITRIFICATION SYSTEM

[75] Inventors: Russell S. Bodwell, Glen Head; William S. Houck, Dix Hills, both of N.Y.

[73] Assignee: Henderson and Bodwell, Plainview, N.Y.

[21] Appl. No.: 863,813

[22] Filed: Apr. 6, 1992

[51] Int. Cl.$^5$ .................................................. C02F 3/30
[52] U.S. Cl. .................................... 210/617; 210/622; 210/630; 210/744; 210/903
[58] Field of Search ............... 210/617, 618, 621, 622, 210/744, 903, 630

[56] References Cited

U.S. PATENT DOCUMENTS

| | | |
|---|---|---|
| 853,217 | 5/1907 | Bordigoni . |
| 3,112,261 | 11/1963 | Porter et al. . |
| 3,371,033 | 2/1968 | Simmons et al. . |
| 3,829,377 | 8/1974 | Hashimoato . |
| 3,892,659 | 7/1975 | Kirk .................... 210/744 |
| 3,964,998 | 6/1976 | Barnard ................ 210/621 |
| 3,994,803 | 11/1976 | Neff et al. . |
| 4,173,531 | 11/1979 | Matsch et al. . |
| 4,322,296 | 3/1982 | Fan et al. ............. 210/903 |
| 4,895,645 | 1/1990 | Zorich, Jr. ............ 210/98 |
| 4,915,841 | 4/1990 | Lagana et al. ........ 210/605 |
| 5,049,266 | 9/1991 | Gotz et al. ............ 210/151 |

FOREIGN PATENT DOCUMENTS

| | | |
|---|---|---|
| 3419139 | 11/1985 | Fed. Rep. of Germany . |
| 3431568 | 8/1986 | Fed. Rep. of Germany . |
| 1110962 | 10/1955 | France ................. 210/151 |
| 1-99690 | 4/1989 | Japan . |
| 26013 | of 1909 | United Kingdom . |

OTHER PUBLICATIONS

L. J. Sikora et al., "Evaluation of a Sulfur-*Thiobacillus denitrificans* Nitrate Removal System," *J. Environ. Qual.*, vol. 5, No. 3, 1976, pp. 298–303.

Driscoll, "The Use of Sulfur and Sulfide in Packed Bed Reactors for Autotrophic Denitrification," *Journal WPCF*, Mar. 1978, pp. 569–577.

Andreoli et al., "Nitrogen Removal in a Subsurface Disposal System," *Journal WPCF*, Apr. 1979, vol. 51, No. 4, pp. 841–854.

"Nitrification and Denitrification Facilities Wastewater Treatment," United States Environmental Protection Agency, Aug. 1973, pp. 27–33.

The Long Island Comprehensive Waste Treatment Management Plan, vol. B, Summary Plan, Koppelman, Director, Nassau-Suffolk Regional Planning Board, Hauppauge, New York, Jul. 1978 ("Long Island 208 Plan").

Dix, "Village Operates Innovative Stone Filter System," West Virginia University, Morgantown, West Virginia.

Swanson et al., "On-Site Batch Recirculation Bottom Ash Filter Performance," Environmental Protection Agency Small Flows Clearinghouse.

Subsurface Denitrification Specification, Suffolk County Department of Health Services, 1984.

*Primary Examiner*—Ivars Cintins
*Attorney, Agent, or Firm*—Collard & Roe

[57] ABSTRACT

Process for the microbiological nitrification and denitrification of wastewater utilizes wastewater and endogenous carbon as carbon sources. After removal of settleable solids in the wastewater stream in a settling tank, wastewater is discharged into a fixed-bed, down-flow, aerobic, free draining nitrification field, containing suitable media to facilitate the growth of microorganisms capable of converting influent nitrogen, in the form of ammonia, to nitrite and then nitrate, by passing the wastewater through the nitrification field. Microbiological activity is facilitated by means of an adjustable recycle stream which adds dissolved oxygen to the aerobic nitrification field and provides sufficient dosing of the media to insure the wetting necessary to support continuous microbiological activity. Nitrified wastewater from the nitrification field discharges into a flow splitting device which divides the wastewater into two streams, one for recycling back to the nitrification field and one for denitrification in a fixed-bed upflow denitrification chamber, utilizing a suitable denitrification media. Denitrified wastewater is then conveyed to a discharge system for disposal.

10 Claims, 10 Drawing Sheets

DENITRIFICATION SYSTEM

BACKGROUND OF THE INVENTION

1. Field of the Invention

The present invention relates to the microbiological nitrification and denitrification of wastewater.

2. The Prior Art

Nitrogen, a component of domestic wastewater, exists in several forms, all of which are cause for concern when discharged to the environment in an uncontrolled manner:

1) The nitrogen in ammonia ($NH_3$) exerts an oxygen demand on the water in which it is discharged, and is known to be toxic to many forms of aquatic life;

2) The nitrogen in nitrite ($NO_2$) is toxic if ingested by vertebrate forms of life. Because it is unstable in solution it is usually not of public health significance;

3) The nitrogen in nitrate ($NO_3$) is believed to be toxic to infants under the age of 6 months, causing a condition known as infant methemoglobinemia, wherein chemical conditions unique to the baby's stomach convert the nitrate to nitrite, which then exerts its toxic effect and interferes with the role of hemoglobin in human respiratory and metabolic function;

4) All forms can act as a plant nutrient, stimulating undesirable growth of algae and other aquatic plant life.

Conventional secondary wastewater treatment generally leaves soluble forms of nitrogen unaffected. Some reduction in total nitrogen is achieved, because forms known as organic nitrogen that are particulate or colloidal are generally coagulated and removed by sedimentation. In more recent years, particularly the last 20 years, some wastewater treatment plants have been built to achieve nitrification (the conversion of ammonia to nitrate), in order to remove the oxygen demand that ammonia exerts on receiving waters. More recently, wastewater treatment plants have been designed to achieve total nitrogen removal in order either to protect drinking water supplies from the potential of nitrate levels exceeding drinking water standards, or to protect sensitive watersheds from nitrogen related eutrophication.

In order for nitrogen to be removed biologically, the following steps are required:

1. In a first step, organic matter in the sewage is oxidized in the presence of dissolved oxygen by heterotrophic bacteria (secondary treatment);

2. In a second step, in the same reactor, or possibly a successive reactor, autotrophic bacteria oxidize ammonia nitrogen into nitrite and then into nitrate nitrogen;

3. In a third step, additional heterotrophic bacteria use the nitrate as an oxygen source in order to oxidize and consume additional organic material. This step takes place in the absence of dissolved oxygen, which forces organisms to turn to nitrate as the source of oxygen.

A variation on the third step uses sulfur instead of organic carbon. Instead of heterotrophic (carbon consuming) bacteria, a separate culture of autotrophic sulfur oxidizing bacteria, i.e. *Thiobacillus denitrificans* uses the nitrate to oxidize sulfur.

Steps 1, 2 and 3 described above have the disadvantage of requiring the procurement of a separate source of carbon for the denitrification step. This is necessary because the oxidation taking place in Steps 1 and 2 consumes the bulk of the available organic carbon present in the wastewater, and there is not sufficient carbon left for the nitrate reduction in Step 3. There is an additional disadvantage in the sequence described above in that supplemental alkalinity in the form of bicarbonate, carbonate or hydroxide may have to be added in order to maintain an acceptable reaction rate during Step 2.

A variation in this prior art process can be achieved by changing the sequence of the steps listed above, into a process sequence called "Pre-Denitrification." The most basic means of accomplishing this is to put the denitrification step at the beginning of the process. Since no nitrate exists in the raw wastewater, nitrate is supplied to the denitrification step or zone by recirculating nitrified effluent. There are several prominent characteristics to this flow scheme:

1. The significant expense of purchasing sulfur, methanol, or a carbon source other than methanol is eliminated;

2. Denitrification, based on the chemistry of the reactions, releases approximately 50% of the alkalinity that was previously consumed during the nitrification process. In many or most cases, this is a sufficient quantity so that supplemental alkalinity addition is not required;

3. The oxygen present in the nitrate being denitrified is being recycled for the purpose of re-oxidizing organic carbon present in the raw wastewater.

Prior art systems tend to fall into two categories:

1) Devices for the purpose of achieving nitrification or denitrification in modular steps in the conventional flow sequence; and 2) Systems for achieving pre-denitrification by means of recirculating nitrified effluent to a denitrification step at the upstream end of the process.

The use of recirculation occurs in all of these devices, but it must be noted that the purpose of the recirculation may be completely different from one device to the next. This will be discussed in this section since it is felt that it is important when determining differences or similarities between systems.

Neff, U.S. Pat. No. 3,994,803, relates to a filter for accomplishing denitrification with methanol as a source of carbon. This is an example of denitrification as the final stage of a process. The particulate medium in the filter (sand and anthracite) provides a population of heterotrophic bacteria which utilize the nitrate as an oxygen source when consuming the methanol. This filter is always submerged, and periodically must be backwashed in order to remove excess bacterial growth from the filter medium. Failure to do so would result in excessive head loss. Furthermore, nitrogen gas, a by-product of denitrification, builds up in the filter and this must also be purged to prevent excessive headloss from occurring. At the beginning of the filtration cycle following backwash, some dirty backwash water is recirculated to the filter. The purpose of this recirculation is to reseed the filter with the bacteria necessary to accomplish the desired denitrification. This is felt to be necessary because vigorous backwash may strip too much of the viable bacteria off of the sand or anthracite grains in the filter.

Recirculation sometimes plays a role in certain activated sludge processes. Its purpose is to return settled microorganisms ("activated sludge") from the settling tank back to the aerated biological process.

When pre-denitrification is practiced, an additional "internal recirculation stream" is added, returning nitrified activated sludge from the aerated nitrifying zone or reactor to the anoxic or anaerobic denitrifying zone. If all the nitrate entering the denitrifying zone is denitrified, and if all the ammonia entering the nitrifying zone is nitrified, the expected final nitrate (and soluble nitrogen) concentration is (Ammonia in)

$$x \frac{Q}{Q + \Sigma R}$$

where Q is the raw wastewater flow rate and $\Sigma R$ is the sum of recirculation flow rates. This expression shows that the degree of nitrogen removal in a pre-denitrification system is dependent on recirculation flow rate.

Fixed film biological filters, such as trickling filters, fluidized bed reactors and other devices, also utilize recirculation.

Some fixed film reactors, where water is the dispersed phase, such as the trickling filter or recirculating sand filter, use recirculation to (1) ensure that the media is thoroughly wetted; and (2) add dissolved oxygen to the applied liquid.

In order to achieve consistent nitrification, these filters require low organic loading rates. If the wastewater is fairly strong, the corresponding hydraulic loading rate will be low, and may not be sufficient to ensure contact of the applied liquid with all of the media. This problem is solved by recirculating clear effluent, which is low in organic matter, permitting better wetting of the media while keeping organic loading low.

In some cases, dissolved oxygen availability may limit the degree of biological activity. Recirculation aids here, also. In a continuous flow system, such as a trickling filter, research over many years has shown that the rate of absorption of a gas into a liquid flowing over packing is a function of liquid flow rate, frequently proportional to the 0.5–0.8 power. Hence, quadrupling flow rate would double oxygen availability (for exponent=0.5). In an intermittent flow system, such as a sand filter, pump flow rate would be constant, but recirculation would increase the pump running time, thereby increasing proportionately the opportunity for oxygen uptake.

The role of recirculation is similar with fluidized bed systems, with some differences due to the fact that the liquid phase is now the continuous phase:

1. Recirculation controls the degree of be expansion, and the degree of fluid shear against the organisms on the media, which controls biofilm thickness and particle density; and 2. Recirculation water is the means for adding dissolved oxygen to aerobic processes, such as nitrification and organic carbon oxidation. In this application, the recirculation stream is aerated with a compressor prior to reinjection into the column.

In the past, other attempts have been made to overcome these prior art problems, as follows.

Bordigoni, U.S. Pat. No. 853,217, describes a septic tank followed by an upflow anaerobic filter, followed in turn by a downflow aerobic filter. Flow is on a once-through basis without recirculation. Dosing is strictly by gravity.

MacCormac, U.K. Patent No. 26013, describes a settling compartment followed by an anaerobic upflow filter, followed by an aerobic downflow filter. Flow is on a once-through basis and dosing is by siphon.

K. A. Porter, et. al., U.S. Pat. No. 3,112,261, describes an anaerobic biological filter using a lattice grid type medium. Dosage is pumped to the filter and recirculation is used in order to enhance oxygen transfer to the fluid.

Simmons, et. al., U.S. Pat. No. 3,371,033, describes a combination of aerobic activated sludge plus a biological filter. Recirculation is practiced for the purpose of returning so ids to the activated sludge portion of the process as well as maintaining elevated dissolved oxygen in the filter.

Matsch, et. al., U.S. Pat. No. 4,173,531, describes a process for nitrifying activated sludge with a side stream recirculated through a fairly long anaerobic holding process. Return of this stream to the upstream end of the activated sludge aeration basin is alleged to result in far greater nitrogen removal than the material balance for pre-denitrification would predict.

Fan, et. al., U.S. Pat. No. 4,322,296, describes a fluidized bed biological filter. The top plate restricts the degree to which the bed can rise and turns the upper portion of the reactor into a fixed bed filter. This prevents media from escaping the device and eliminates the need for a machine to clean escaped media and return it to the filter. As a result, backwash cycles are required. Recirculation is practiced for the purpose of controlling fluidization velocity and also for adding dissolved oxygen for aerobic processes. The device can be used for either aerobic or anaerobic processes, i.e., either carbon removal, nitrification or denitrification.

Zorich, et. al., U.S. Pat. No. 4,895,645, describes a packaged biological filter wherein pre-denitrification and anaerobic carbon removal take place in an upflow rock filter, while nitrification takes place in a downflow plastic filter. Nitrified plastic filter effluent is recirculated to the anaerobic rock filter along with the raw wastewater, making this a fixed media pre-denitrification system. Recirculation, therefore, is used both for wetting of the plastic trickling filter media and for furnishing nitrate to the anaerobic filter. Two separate recirculation streams are required, but can be furnished by one pump if flow is split.

Lagana, et. al., U.S. Pat. No. 4,915,841, describes an anaerobic suspended growth reactor located in the lower portion of an Imhoff tank, followed by an anaerobic upflow biological filter, followed by an aerobic downflow biological filter (the liquid can be either continuous or discontinuous as desired in the last zone). Recirculation is used both for pre-denitrification and (in the discontinuous phase filter) for the wetting of the aerobic filter. A single recirculation stream to the upstream end of the plant serves both functions.

Götz, U.S. Pat. No. 5,049,266, describes a pre-denitrification system composed of an anaerobic upflow filter followed by an aerobic downflow filter. Recirculation is used to accomplish pre-denitrification. In addition, the downflow filter is of the trickling filter type, i.e. water is not the continuous phase, so recirculation also serves for filter wetting and oxygen transfer.

Other examples of wastewater treatment process include those described in Porter, U.S. Pat. No. 3,112,261; Hashimoato, U.S. Pat. No. 3,829,377; Japanese Patent No. 1099-690A; French Patent No. 1,110,962; German Application No. 3,431,568; and German Application No. 3,419,139.

Nitrate pollution of groundwater is a problem frequently associated with discharges from septic tank leach fields. Bacteria in the soil convert (oxidize) ammonia nitrogen in the wastewater to nitrite and then to nitrate. Nitrate (as nitrogen) in excess of 10 mg/l (ppm) is considered to be a risk factor for methemoglobinemia in infants and certain other susceptible populations, as discussed supra.

In some areas, such as the New Jersey Pinelands, the nutrient value of nitrogen in septic tank effluent is a concern, based on its ability to fertilize nearby surface waters.

As a result of the above, planning documents such as the *Long Island 208 Study* have recommended control of zoning density based on nitrogen loading per acre.

The *Long Island Groundwater Pollution Study* (1969) clearly demonstrated that raw wastewater was fully nitrified and well clarified after passing through only several inches of Long Island sand and gravel beneath a leaching pool such as a cesspool.

Mulbarger et al have demonstrated in numerous instances that a carbon substrate, such as methanol, could be used to achieve denitrification (reduction of nitrate to nitrogen gas) in a low oxygen environment.

Lawrence, at Cornell University (JWPCF, 1970), demonstrated that *Thiobacillus dentrificans* with sulfur substrate and limestone supplement could reduce nitrate to nitrogen gas (used powdered sulfur in agitated column).

Suffolk County Department of Health Services (unpublished study) successfully repeated the work of Lawrence with granular materials in a packed column.

Andreoli, Bartilucci and Forgione (JWPCF, 1979) conducted an experiment wherein a septic tank leach field was underlain by a fiberglass pan which would catch effluent and maintain saturated conditions (in the pan) necessary for a low oxygen environment. Methanol was added to the pan. Nitrification occurred in the leach field and denitrification occurred in the pan.

Suffolk County Department of Health Services (1984) developed a subsurface denitrification design that consisted of gravity feed to septic tanks, gravity feed to leaching pools, leaching through two feet of sand (nitrification), collection in a vinyl (PVC) liner, and passage through an upflow (sulfur and limestone) reactor (denitrification).

This prior art design has undergone several modifications: (a) leaching pools eliminated, only horizontal perforated pipes allowed for dosing, vertical travel through sand increased to four feet; and (b) gravity dosing eliminated, all distribution is now pumped, but main is not pressurized. All hydraulic loadings at one gallon per day per square foot of leaching area.

Swanson, Dix (EPA Small Flows Clearinghouse, Morgantown, W. Va.) and others have demonstrated the effectiveness of recirculating filters for nitrification.

This prior art system has produced disappointing results in numerous installations. The majority of systems do not achieve the needed reduction from 40–50 mg/l total N down to 10 mg/l total N.

Most prior art failures appear to be due to lack of nitrification. Some prior art failures are caused by lack of denitrification. Some prior art failures are caused by plugging of the denitrification reactor, which causes backup into the nitrification field. If the latter occurs, the field becomes saturated (free draining aerobic conditions are required) and nitrification ceases.

SUMMARY OF THE INVENTION

An object of the present invention is directed to overcoming the prior art problem of nitrification failure, the major cause of system failure. Failure to nitrify in the subsurface fields is thought to be due to one or more of the following:

(1) Uneven distribution of wastewater, localized overdosing.

(2) Inability of sufficient oxygen to diffuse into nitrification field (3) Insufficient wetting of all sand media in field. Bacteria cannot grow on sand grains unless they are regularly wetted. The prior art 1 gpd/square foot is not sufficient for this.

The present invention is based upon the addition of a recirculation loop to the prior art denitrification system. The raw wastewater loading of 1 gpd/sf will be retained, but will be supplemented with two to four gpd/sf of recirculated effluent. This will have the following benefits and advantages:

(a) regular dosing will be permitted, even during low flow generation periods, keeping minimum moisture content in the field;

(b) each time it is pumped into the distribution manifold, the wastewater picks up oxygen as it trickles through the gravel distribution layer, and this opportunity will increase fourfold; and (c) the higher hydraulic loading will force the applied liquid to spread out more on the surface of the sand, promoting better distribution.

The system of the invention includes the following components:

(1) septic tank—removes settleable and floatable solids;

(2) lift station (i.e., recirculation loop);

(3) distribution manifold—may be pressure or atmospheric;

(4) gravel layer (10 inch)—allows aeration of wastewater, permits some spreading of liquid;

(5) sand layer—3'6" thick—nitrification occurs here;

(6) filter fabric;

(7) gravel layer—about 6"

(8) perforated drain;

(9) vinyl collection pan;

(10) flow splitting manhole. This manhole contains an aluminum or fiberglass splitter box comprising a central influent compartment with removable V-notch weirs at each end. The weirs discharge into effluent chambers. One effluent chamber leads on to the denitrification process stage. The other returns to the lift station (i.e., the recirculation loop). As flow through a V-notch weir is proportional to the tangent of its half-angle, by using weir plates of various angles, the ratio of flow returned to that sent on can be varied greatly. The flow that is not returned goes on to a perforated distribution manifold in the bottom of a sulfur-limestone reactor (upflow). Effluent overflows into a leaching pool for final disposal.

The system according to the invention will permit nitrification largely independent of grain size distribution in the sand layer (thereby simplifying construction procedures), and adjustment of recirculation flows to optimize nitrification based upon as-built conditions in the nitrification layer and with respect to other variables in the nitrification process.

Denitrification can be achieved with existing methods of utilization of a sulfur-limestone reactor or by methanol stripping.

The present invention provides a process for the microbiological nitrification an denitrification of wastewater. The wastewater receives initial treatment in a settling basin, the preferred embodiment of which is a septic tank. Effluent wastewater from the settling basin flows to the aerobic, free-draining nitrification field either by fixed-bed gravity or by pumping. The nitrification field, which is either fully enclosed or enclosed only at the bottom, consists of a graded media, graded by particle size, through which wastewater enters at the top, by flow through perforated pipes surrounded by a layer of gravel covered by a filter fabric to prevent contamination and clogging of the gravel by granular material from above. After passing through the graded media and becoming nitrified, wastewater is collected at the bottom of the nitrification field by perforated pipes, surrounded by a layer of gravel covered by filter fabric to prevent contamination and clogging of the gravel by the graded media. The nitrification field is underlain by an impervious liner to prevent seepage of the nitrified wastewater into the ground.

Wastewater collected at the bottom of the nitrification field flows by gravity to a flow splitting device configured to divide wastewater flows into two streams. One wastewater flow stream is recirculated back to the nitrification field by pumping; the other wastewater flow stream flows by gravity to the fixed-bed upflow denitrification chamber which, in the preferred embodiment, utilizes sulfur and limestone for the denitrification media. After passing through the denitrification chamber, denitrified wastewater is conveyed by gravity to a discharge system, the preferred embodiment of which is subsurface effluent disposal by leaching through a soil substrate. Subsurface effluent disposal in the preferred embodiment is usually by leaching field or leaching pools. The present invention may be utilized in an above ground embodiment, in a below ground embodiment, or in a combination of above and below ground embodiment.

The present invention uses a large, lightly loaded reactor which will generate minimal sludge. Recirculation is used to enhance nitrification. Denitrification is achieved in a flooded upflow sulfur-limestone reactor. The nitrification basin is large enough to allow for any slowdown in reaction rate due to pH depression. The resulting system will function with a minimum of mechanical maintenance required.

The inventive process comprises a method for recycling a sufficient amount of the wastewater back into the nitrification system so that there will be a sufficient wetting of all sand media in the nitrification field in order to assure a microbiological action to act upon the nitrogen in the wastewater, and bring the total of nitrogen down to 10 mg/l or other acceptable levels. The ammonia nitrogen in the wastewater would thus be liberated as nitrogen gas by the biological action of the bacteria and/or other treatment of the wastewater. In the prior art denitrification systems, it has been found that they do not achieve sufficient wetting of all of the sand media so that the bacteria is detrimented in the prior art, and is not able to function to bring the nitrogen down to acceptable levels.

Generally speaking, the process of the invention utilizes batchwise, or continuous, recycling of the wastewater back to the nitrification field to insure continuous wetting of the nitrification field, and to constantly supply the bacteria not only with moisture, but also with oxygen and with organic matter.

More particularly, the invention includes recycling a portion of the wastewater back into the nitrification system which includes a filter bed of sand and gravel in order to achieve acceptable levels of wetting and, thus, allow the biological action to take place over a larger percentage of the wastewater. The installation includes lowering the pump in the pump pit so as to be level with or below the collection pipes in the nitrification field. Moreover, there is also provided a weir to allow a portion of the wastewater to be returned to the top surface of the field for recycling.

In a further embodiment, the invention includes an automatic control device such as a microprocessor for the pump and the weir or valve, which control device would be sensitive to the amount of wetting taking place, the temperature and other factors. Once the percentage of recycled wastewater has stabilized due to achieving steady state operation of the process, the intervention of the control device into the system could be minimized or could be eliminated altogether. However, continuous monitoring by the control device is preferred: (1) in case the inflow from the settling tank into the nitrification field is so very low that 100% recycling is required; or (2) in case there is a surge of wastewater from the settling tank into the nitrification field, then 0% recycling is required.

The invention includes a process for the microbiological nitrification and the microbiological denitrification of wastewater comprising the steps of:

(a) removing settleable solids from the wastewater in a settling tank zone, producing a wastewater output and transporting this output to a fixed-bed nitrification field zone;

(b) nitrifying the wastewater output from the settling tank zone in the fixed-bed nitrification field zone by conversion of nitrogen, first to nitrite and then nitrate, by aerobic microbiological activity, producing a wastewater flow; and transporting the wastewater flow to a separation zone;

(c) splitting of the wastewater flow from the nitrification field zone into a first stream and a second stream in a separation zone;

(d) recycling back the first stream to the nitrification field zone, such that a sufficient amount of the wastewater is recycled back into the nitrification field zone so that there will be sufficient wetting of all the nitrification field zone in order to assure a continuous microbiological activity to act upon the nitrogen in the wastewater; and transporting the second stream for denitrification to a denitrification chamber zone;

(e) denitrifying the wastewater in the second stream in a fixed-bed denitrification chamber zone with a microbiological denitrification media; and (f) disposing of wastewater from the denitrification chamber zone through a discharge system.

As heretofore discussed, processes and apparatuses similar to the present invention have failed to achieve the desired nitrification and denitrification because of failure of the nitrification field to achieve the required aerobic microbiological nitrification. The use of the flow splitting device in the present invention, providing for recycling of sufficient wastewater back to the nitrification field, will enable the nitrification field to achieve the required nitrification.

BRIEF DESCRIPTION OF THE DRAWINGS

Other objects and features of the present invention will become apparent from the following detailed description considered in connection with the accompanying drawings, which disclose several embodiments of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
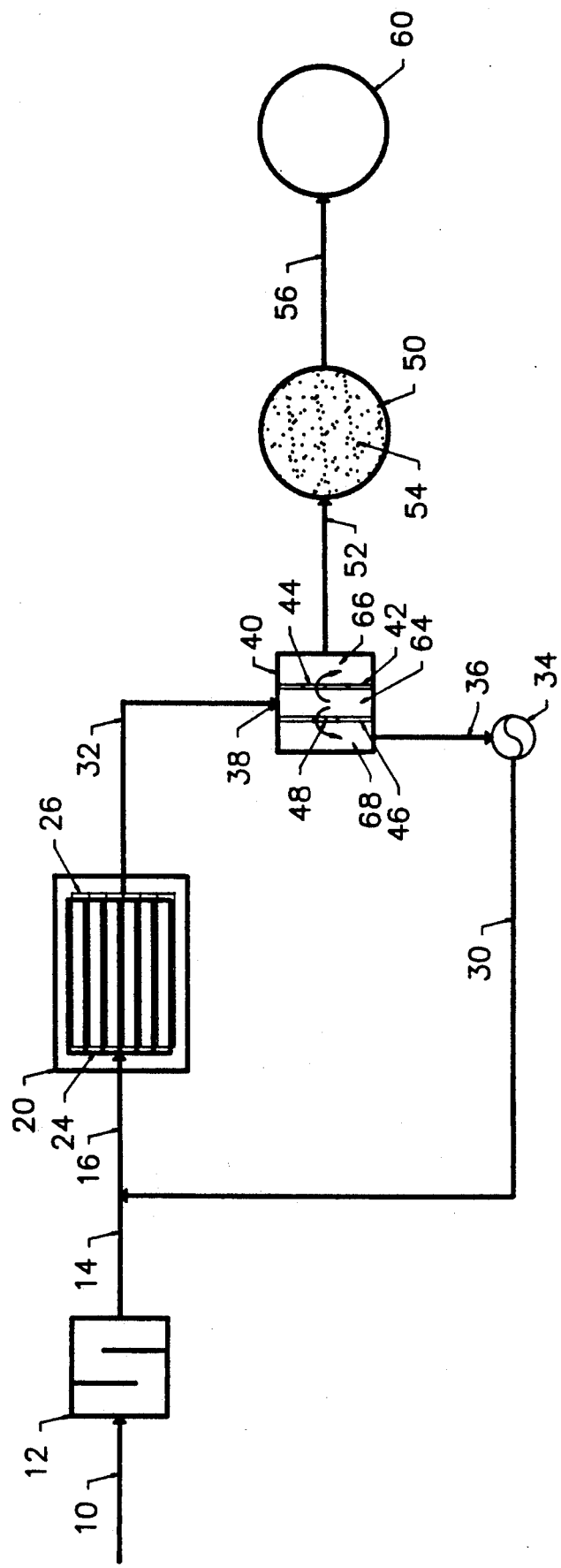
FIG. 1 is a block diagram plan view of the process incorporating gravity feed of wastewater to the nitrification field.
Figure 2:
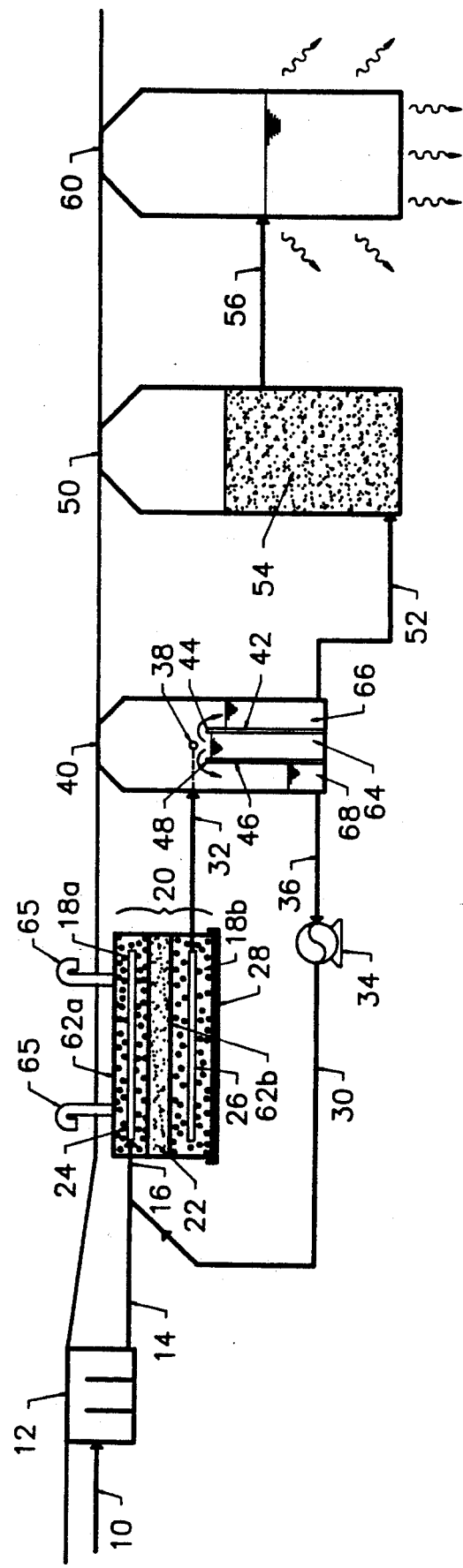
FIG. 2 is a block diagram side view of the process incorporating gravity feed of wastewater to the nitrification field of FIG. 1.
Figure 3:
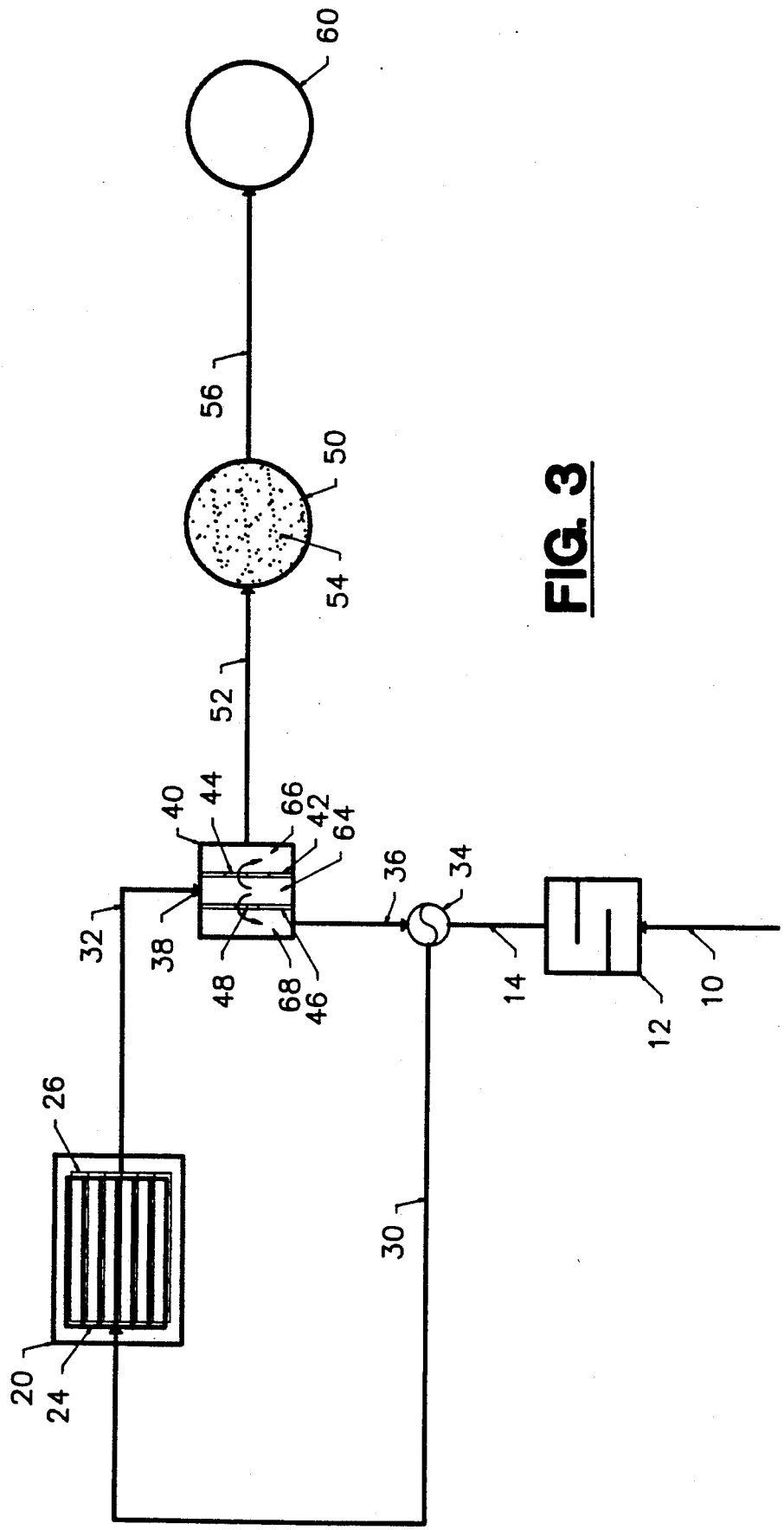
FIG. 3 is a block diagram plan view of the process incorporating pump pressure feed of wastewater to the nitrification field.
Figure 4:
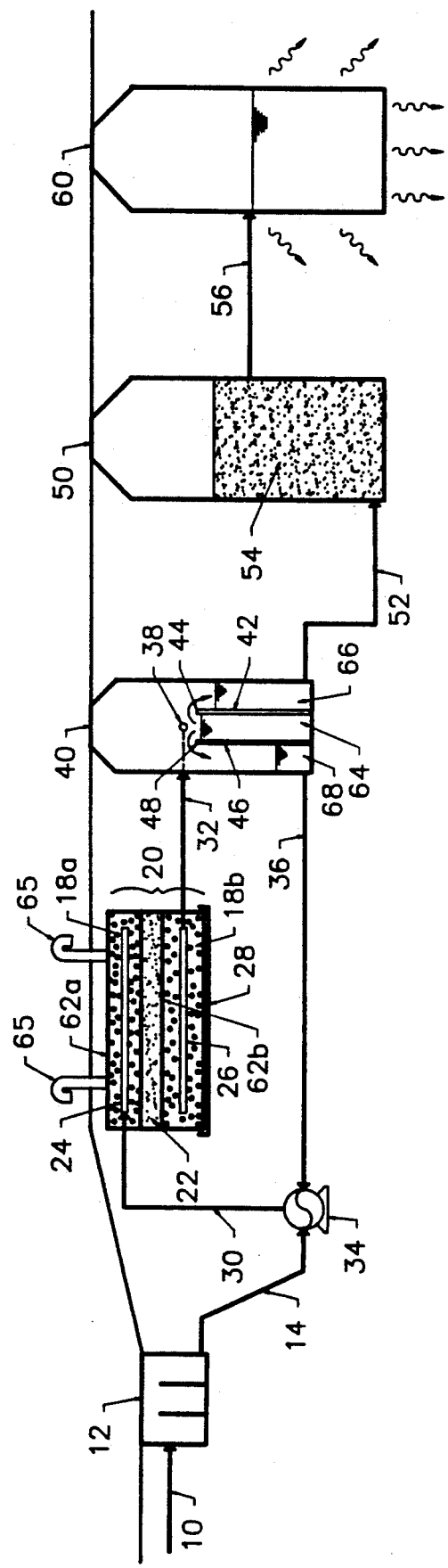
FIG. 4 is a block diagram side view of the process incorporating pump pressure feed of wastewater to the nitrification field of FIG. 3.
Figure 5:
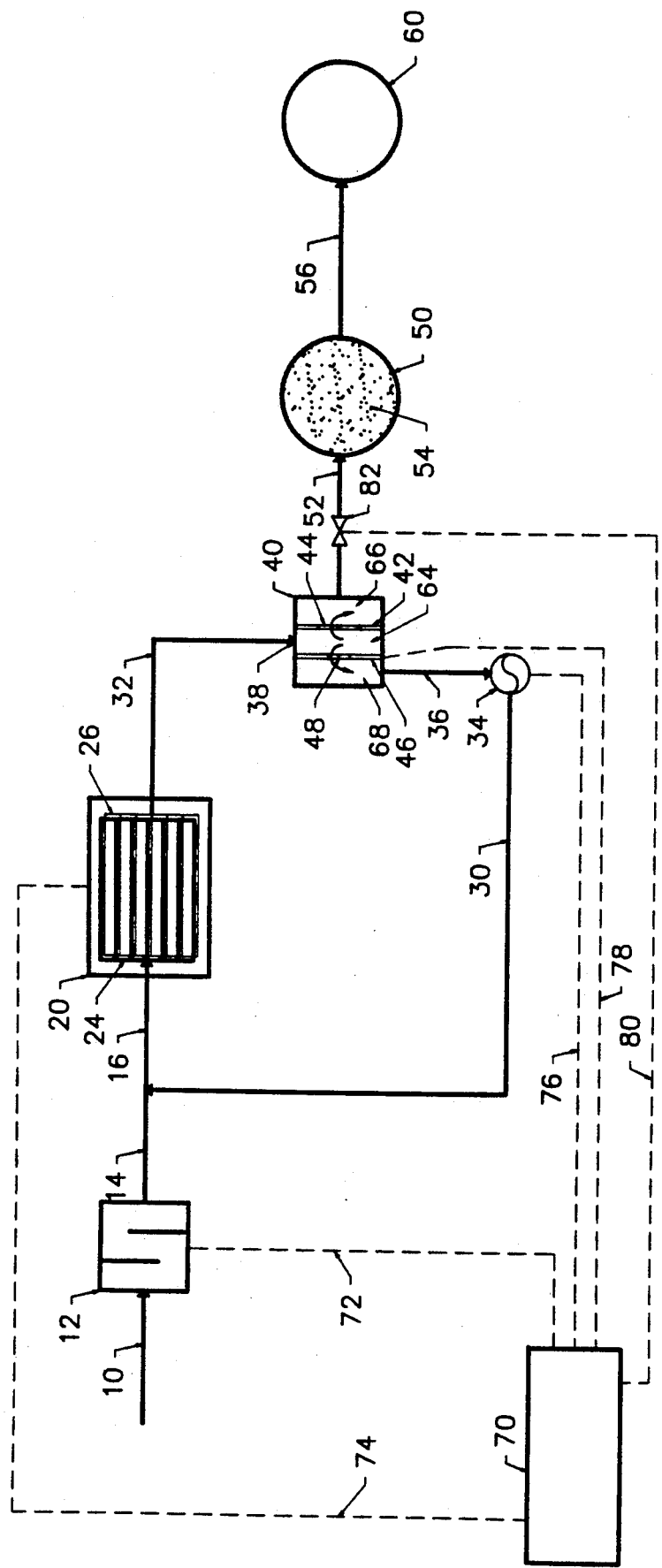
FIG. 5 is a block diagram plan view of the process incorporating gravity feed of wastewater to the nitrification field, including a monitoring control device.
Figure 6:
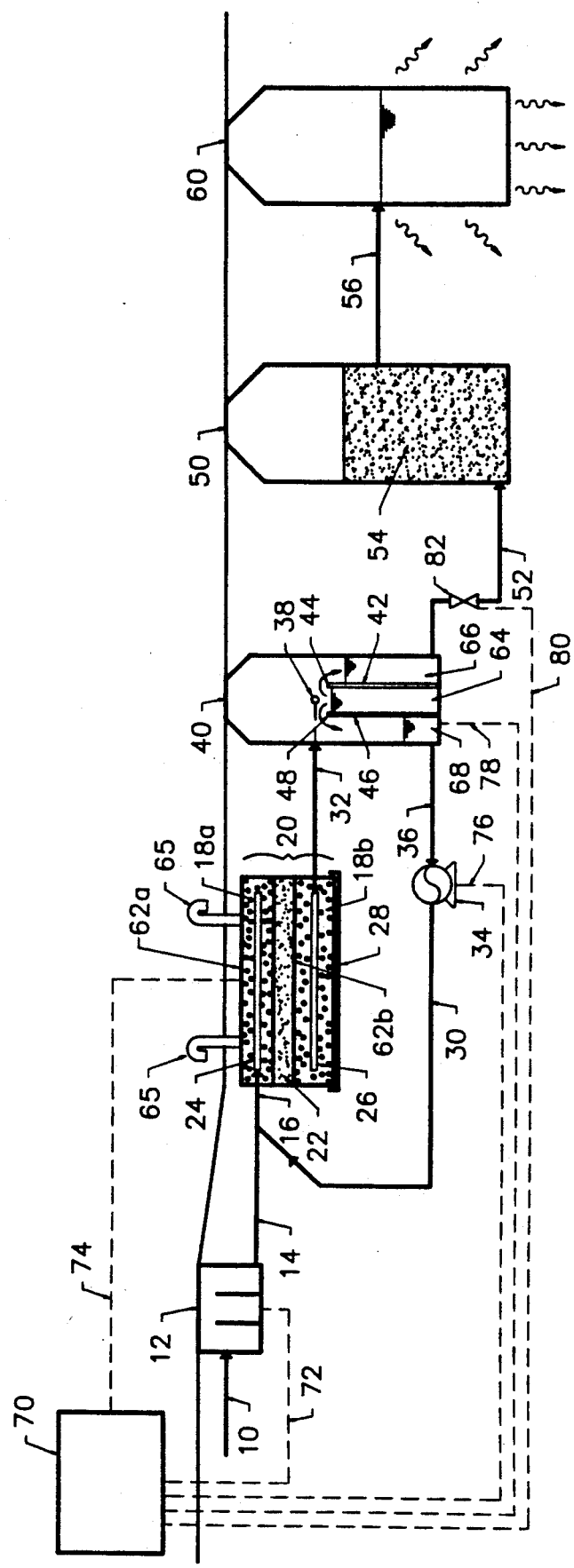
FIG. 6 is a block diagram side view of the process incorporating gravity feed of wastewater to the nitrification field of FIG. 5, including the monitoring control device.
Figure 7:
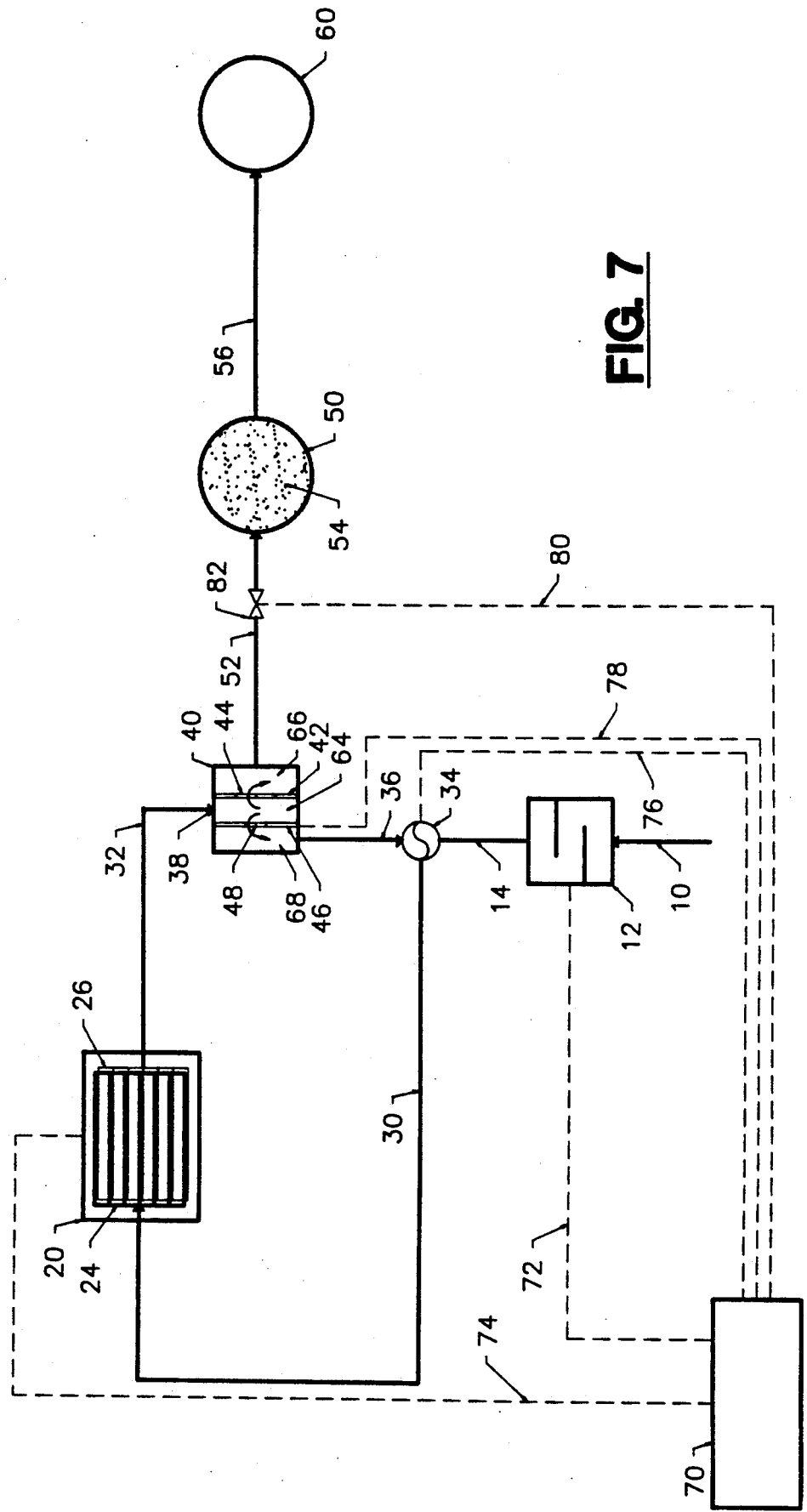
FIG. 7 is a block diagram plan view of the process incorporating pump pressure feed of wastewater to the nitrification field, including a monitoring control device.
Figure 8:
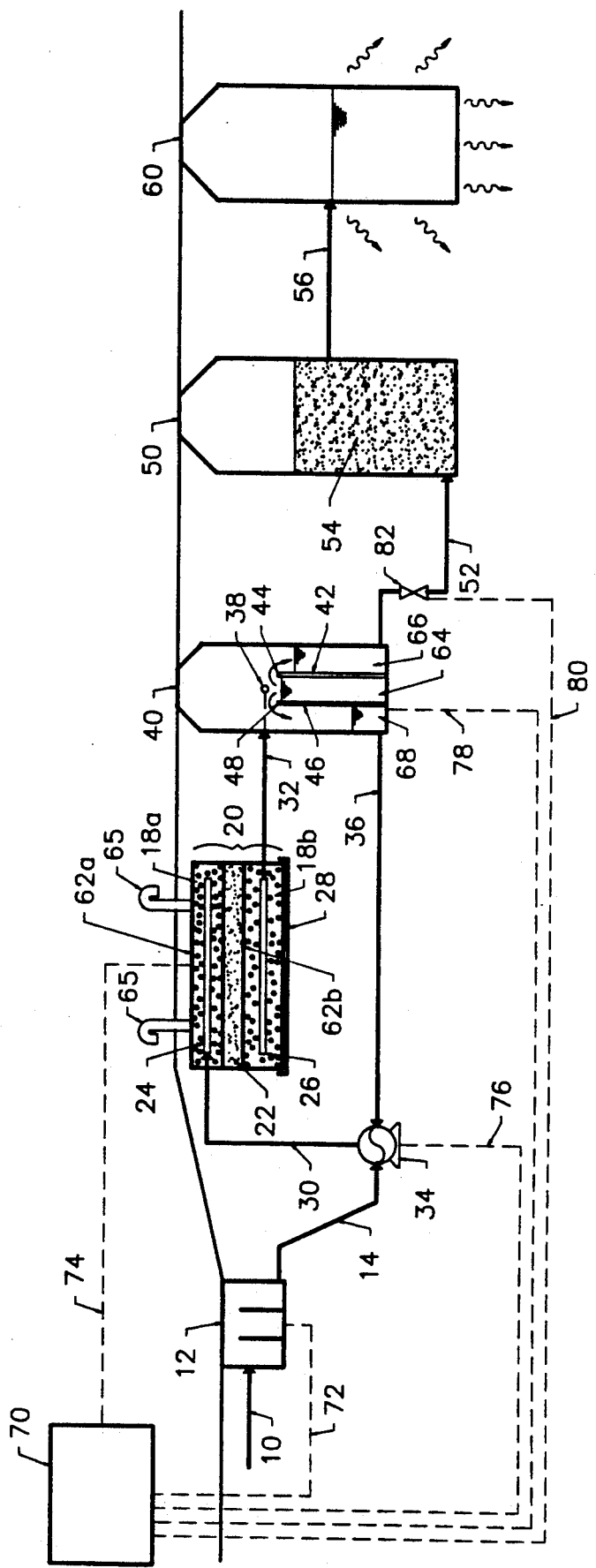
FIG. 8 is a block diagram side view of the process incorporating pump pressure feed of wastewater to the nitrification field of FIG. 7, including the monitoring control device.

Turning now in detail to the drawings, FIGS. 1 and 2 show that influent wastewater from a source of wastewater production flows into a settling basin 12, through influent line 10, where settleable solids are removed from the wastewater. The preferred embodiment of the settling basin 12 is a septic tank Effluent wastewater from the settling basin 12 flows by gravity out of the settling basin discharge line 14 and continues to the nitrification field influent line 16. The nitrification field influent line 16 also receives flow from the recycle line 30 which will be further discussed herein.

Wastewater from line 16 enters the nitrification field 20 near the top through a series of horizontal perforated pipes 24 interconnected on both ends to form a manifold, the preferred embodiment of which is made of four inch diameter plastic pipe. The perforated pipes 24 are surrounded by a layer of gravel 18a approximately ten inches thick and comprised of three-quarter inch to one and one-half inch diameter stones. The layer of gravel is covered on top by a filter fabric 62a to prevent contamination and clogging of the gravel 18a and pipes 24 by smaller size granular material from above. Where granular material covering the layer of gravel 18a is of too small a particle to permit passage of air through the granular material, at a rate such that adequate quantities of air are available to allow for sufficient diffusion of oxygen to the wastewater in the nitrification field 20, ventilation pipes 65 are added to the process to permit the passage of air directly to the gravel 18a. While in the preferred embodiment of the invention oxygen is added to the wastewater at the nitrification field 20, oxygen may also be diffused at other locations in the process such as the recycle chamber 68 or the recycle line 30. After passing through the perforated pipes 24 and out of the perforations therein, wastewater enters the surrounding gravel 18a and is distributed throughout the interstitial spaces of the gravel 18a. This wastewater percolates downward by gravity through the gravel 18a and then through a graded filter media 22 of a thickness suitable to the media used. The preferred embodiment for the media 22 is compacted sand and gravel three feet to four feet in thickness, where the wastewater ammonia nitrogen is converted to nitrite and then nitrate by aerobic microbiological activity. After the now nitrified wastewater passes through the graded filter media 22, it flows into the interstitial spaces of the gravel 18b, which gravel is approximately eight inches thick and comprised of three-quarter inch to one and one-half inch diameter stones.

Gravel 18b surrounds a series of horizontal perforated pipes 26 interconnected on both ends to form a manifold, the preferred embodiment of which is made of four inch diameter plastic pipe. The gravel layer 18b is covered on top by a filter fabric 62b to prevent contamination and clogging of the gravel 18b and pipes 26 by the graded filter media 22. The gravel layer 18b is underlain by a continuous high density flexible polyvinyl chloride or polyolefin plastic (such as polyethylene or polypropylene) sheet 28 for the full areal extent of the nitrification field 20. The plastic sheet 28 is turned up along all edges for a vertical distance of at least two feet in a manner such that the impermeable plastic sheet 28 forms a basin that is approximately two feet in depth for the areal extent of the nitrification field 20. The nitrified wastewater is collected in the perforated pipes 26 and flows by gravity into and through the nitrification field effluent nitrified wastewater line 32 to a flow splitting device 40.

The flow splitting device 40 divides the nitrified wastewater into two streams. One stream is discharged from the flow splitting device 40 into a pipe 52 to carry the nitrified wastewater by gravity to the denitrification chamber 50. The other stream, termed the recycle stream, is discharged from the flow splitting device 40 into a pipe 36 to carry the nitrified wastewater recycle stream to a recycle/dosing pump 34. The recycle/dosing pump 34 pumps the nitrified wastewater recycle stream to the nitrification field influent line 16, through line 30, where the recycle stream performs the function, during periods of low or no wastewater influent flow through influent line 10 of maintaining the graded filter media 22 in a wetted condition and also providing a source of oxygen, both required for the aerobic microbiological nitrification to take place in the nitrification field 20.

Processes in the prior art have failed to incorporate a recycle stream to provide this wetted condition, organic matter and oxygen during periods of low or no wastewater influent flow, resulting in failure of the prior art process and apparatus to achieve the desired nitrification and denitrification.

The flow splitting device 40 illustrated in the embodiments depicted in FIGS. 1 through 8 receives nitrified wastewater flow at the discharge point 38 of the nitrified wastewater line 32. Nitrified wastewater discharged into the influent chamber 64 of the flow splitting device 40 rises and spills over each of two weirs 44 and 48. The weir 48 to the recycle chamber 68 is separated from influent chamber 64 by a wall 46; and the weir 44 to the discharge chamber 66 is separated from influent chamber 64 by a wall 42. Although other methods of flow splitting will achieve satisfactory results, in the preferred embodiment, both of the weirs are of the V-notched type and are removable and replaceable by other V-notched weirs of varying dimensions and notch angle in order that the process may be calibrated to maximize nitrification in the nitrification field 20 by selecting the recycle flow based upon influent wastewater flow rates in the settling basin 12.

The weight ratio of the first stream in recycle line 36 to the second stream in line 52 ranges from 2 to 10:1, preferably from 3 to 5:1.

The operation of the recycle/dosing pump 34 is controlled by float switches in the recycle chamber 68 which turns the pump on when nitrified wastewater rises to a pre-set level and turns the pump off when nitrified wastewater falls to a pre-set level. An alternate method of controlling the recycle flow also uses a weir arrangement as described above except that weir elevations are raised and lowered automatically by motor driven worm gears. The elevations of the weirs and operation of the motors are controlled manually in FIGS. 1 to 4, or are controlled by a microprocessor 70 (FIGS. 5 to 10), based upon influent wastewater flow rates into the settling tank or zone 12, in a manner such that nitrification in the nitrification field 20 is maximized.

Microprocessor 70, through lead line 72, measures the wastewater inflow and water level in settling zone 12; through electrical lead 74, it measures moisture content and dissolved oxygen levels in nitrification field 20; through electrical lead 78, it measures the liquid level in recycle chamber 68; and through electrical lead 76, it controls the on/off function of recycle pump 34 in recycling wastewater from chamber 68 to the nitrification field 20, to maintain a sufficiently wetted condition for the microorganisms therein. Microprocessor 70 is a feedback control and monitoring device.

Microprocessor 70 is a known device, and suitable examples of these devices are found in the Kendall et. al. U.S. Pat. No. 4,165,532; the Evelyn-Veere et. al. U.S. Pat. No. 4,176,395; the Kendall U.S. Pat. No. 4,189,776; the Hamilton U.S. Pat. No. 4,423,484; the Hirsch U.S. Pat. No. 4,567,563; the Snoddy et. al. U.S. Pat. No. 4,569,020; the Unruh et. al. U.S. Pat. No. 4,626,984; the Waltzer et. al. U.S. Pat. No. 4,646,224; the Waltzer et. al. U.S. Pat. No. 4,799,142; and the Mark U.S. Pat. No. 4,922,433.

The disclosures of these patents is incorporated by reference.

Microprocessor 70, through electrical lead 78, measures the liquid level in recycle chamber 68; if this level is below a desired volume, then through electrical lead 80 it can restrict the opening size of valve 82 in outlet line 52 to the denitrification chamber 50. On the other hand, if this liquid level 68 is above a desired volume, then through lead 80, microprocessor 70 can enlarge the opening size of valve 82 in outlet line 52 to the denitrification chamber, to increase the flow into line 52.

Figure 9:
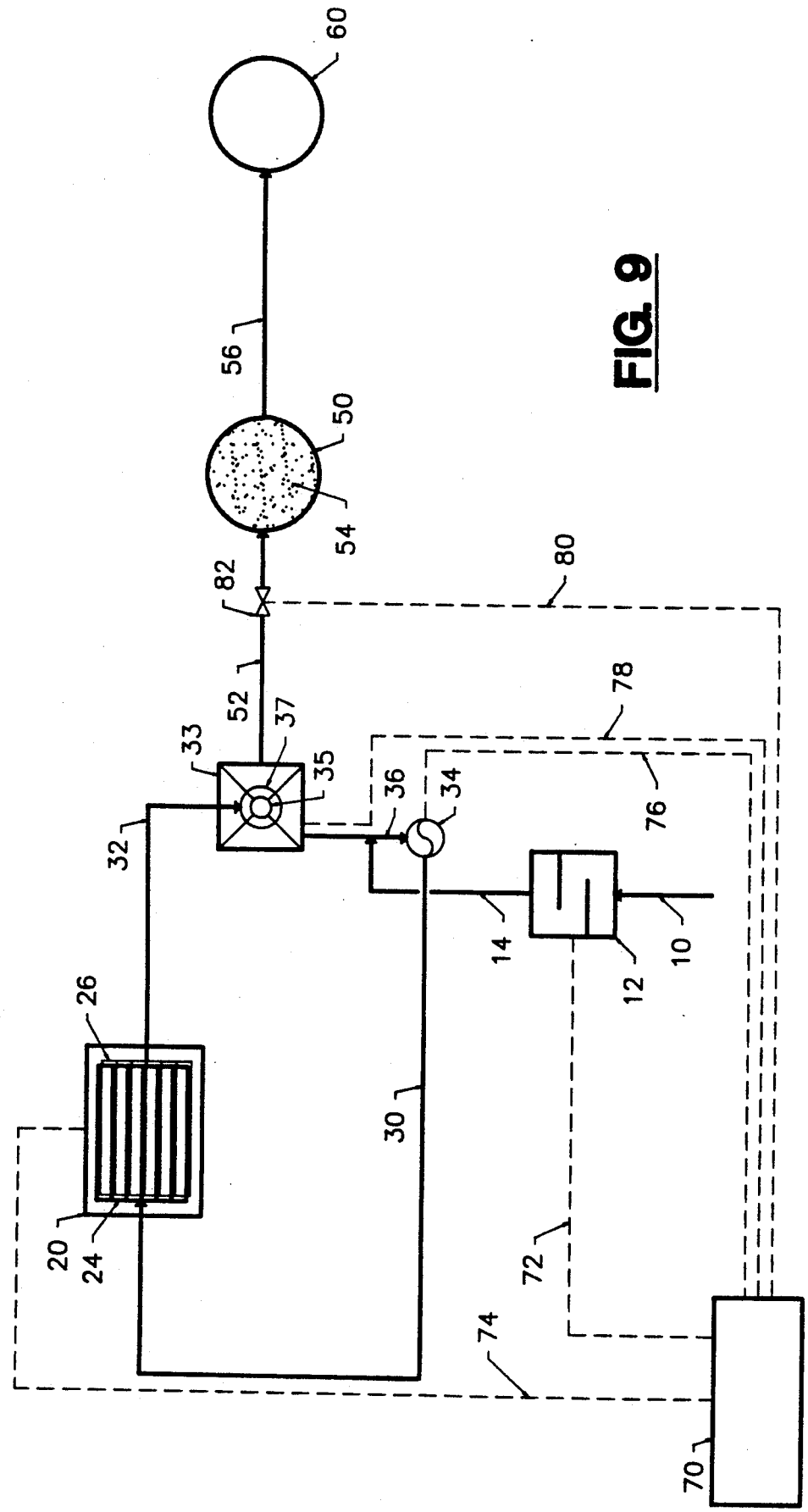
FIG. 9 is a block diagram plan view of the process without the use of weirs.
Figure 10:
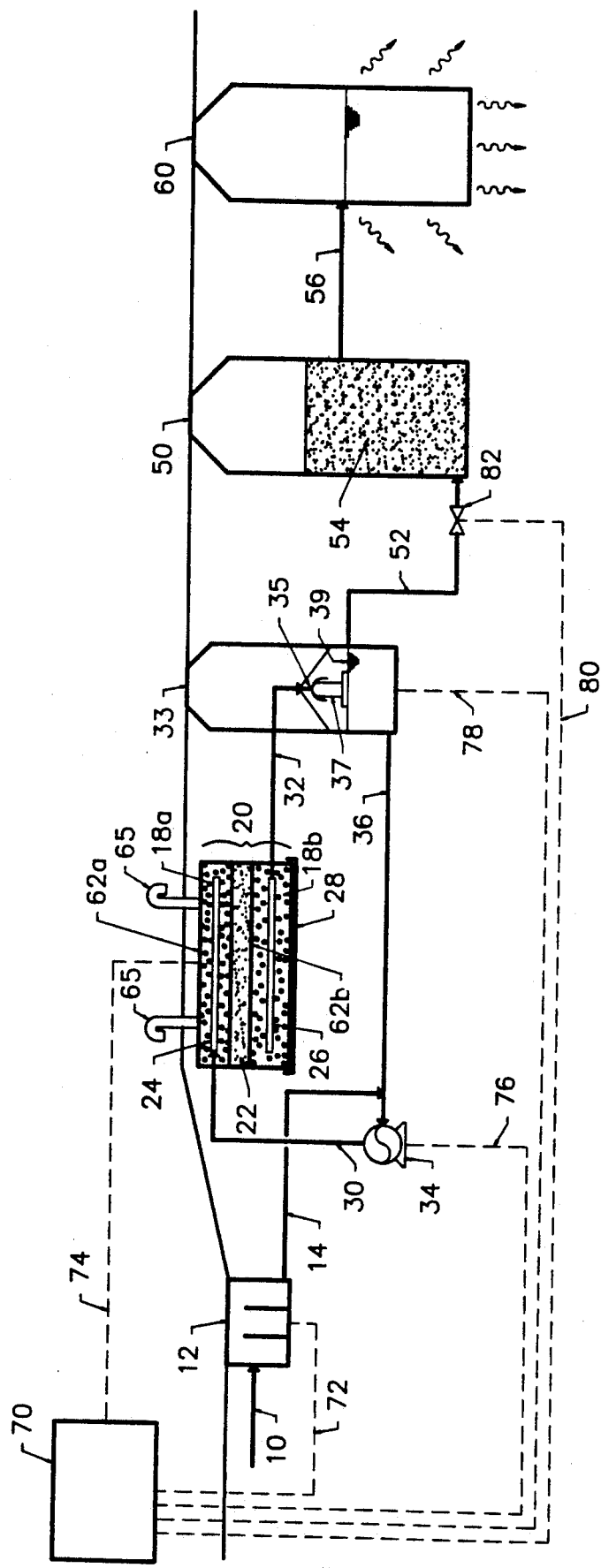
FIG. 10 is a block diagram side view of process without the use of weirs of FIG. 9.

An additional embodiment of the process, as shown in FIGS. 9 and 10, eliminates the use of weirs 44 and 48. Nitrified effluent from the nitrification field 2 flows to the chamber 33 of the recycle/dosing pump 34 through a valve 35, including a float 37. Settled wastewater flows into the recycle/dosing pump 34 through the settling basin discharge line 14. When the liquid reaches a level 39, the float 37 rises and closes the valve 35, and any additional nitrified effluent leaving the nitrification field 20 is forced into the outlet line 5 to the denitrification chamber 50. If valve 35 is closed, then pump 34 pumps liquid from line 14 into field 20. When sufficient settled wastewater enters the pump chamber 33, the pump 34 is activated via a float switch and receives liquid from the pump chamber 33 via line 36. Thus, sufficient liquid flows to the nitrification field 20, which may be mixed with liquid from line 14. The float valve 35 opens again, and the pump chamber 33 receives liquid flow from the nitrification field 20. The recirculation ratio can be varied by changing the elevations of the pump 34 start and stop floats relative to the float valve 35.

Microprocessor 70, in FIGS. 9 and 10, controls the system and receives input data through electrical leads 72, 74 and 78, and sends output signals to pump 34 through lead 76, and to valve 82 through lead 80, as discussed above.

Nitrified wastewater flow enters the fixed-bed up flow denitrification chamber 50 near the bottom and rises up through the denitrification media 54 where denitrification takes place by biochemical reaction between the nitrified wastewater and the denitrification media 54. In the preferred embodiment, the denitrification media 54 consists of equal quantities by weight of sulphur bricks and limestone uniformly mixed and distributed within the denitrification chamber 50. Denitrified wastewater flows out of the denitrification chamber 50 by gravity through line 56 into the discharge system 60. The preferred embodiment of system 60 is subsurface effluent disposal by leaching through a soil substrate, although discharge above ground is also a suitable method of disposal.

FIGS. 1, 2 5 and 6 show the embodiment wherein the process incorporates gravity feed of wastewater from the settling tank to the nitrification field.

FIGS. 3, 4, 7 and 8 show another embodiment of the process of the invention in which there is the incorporating of pump pressure feed of wastewater from the settling tank to the nitrification field. Effluent wastewater from the settling tank or basin 12 flows by gravity out of the settling basin discharge line 14 to the recycle/dosing pump 34. The liquid in line 14 and the liquid from line 36 merge together into pump pressure zone around pump 34. The pump 34 then discharges the wastewater from line 14 and the nitrified wastewater recycle stream from line 36 into the nitrification field 20 through pipe 30. In this embodiment of the process, the flow into the nitrification field 20 is pressurized by the pump 34 and pump 34 operation is effected by float switches in the recycle chamber 68.

Microprocessor 70, in FIGS. 3, 4, 7 and 8 controls the system and receives input data through electrical leads 72, 74 and 78, and sends output signals to pump 34 through lead 76 and to valve 82 through lead 80, as discussed above.

The method of operation of the present invention comprises an aerobic recirculating biological filter referred to herein as the nitrification field (20 in FIGS. 1–10) followed by a flooded anaerobic filter referred to herein as the denitrification chamber (50 in FIGS. 1–10). Prior art devices have been used primarily to produce effluents that were clear, unobjectionable, and relatively free of putrescible materials. Their design had not generally been targeted towards removal of such specific components of wastewater as nitrogen. The present invention relates specifically to solving the nitrogen problem in wastewater.

Biological filtration has long been in use. Percolation of settled sewage water through a bed of gravel or sand has been observed to result in a clear effluent. The degree of clarification is affected by the surface area available for the colonization of beneficial microorganisms. Sand has a high surface area per unit volume, but is relatively restrictive hydraulically. Gravel permits very free flow, but has a limited surface area.

Investigations over many years has shown that the surface of the material of a filter is clonized by various organisms. These tend to be, in order of succession, bacteria, protozoans, stalked ciliates, rotifers, nematode worms, and so on, with the higher life forms being found vertically further down in the filter. If filter loading is low enough, additional autotrophic bacteria will be found, which will oxidize the nitrogen of the ammonia into the wastewater to nitrite and nitrate.

In order for a filter to be effective, regardless of the medium used, all liquid must come into contact with all of the microorganisms on the surface area on the media. The microprocessor 70 controls the wastewater level in the nitrification field 20, by measuring the liquid level therein, and by increasing or decreasing the amount of recycled liquid to field 2 in order to maintain the level that provides for total wetting of all the microorganisms on the surface area of the media within the nitrification field.

If only a moderate degree of wastewater clarification is desired, this may not be a problem since applied flow rates will be high. If, on the other hand, full conversion of ammonia to nitrate is desired, application flow rates must be low, and there may be difficulty insuring full coverage, by the applied liquid, of the filter media. Higher wastewater flow rates will prevent sufficient contact with the desired nitrifying bacteria. Therefore, such higher loadings is not a way of insuring the proper wetting. In addition, full oxidation of carbonaceous material followed by full oxidation of nitrogen results in a higher oxygen requirement per unit volume of wastewater.

The process according to the invention of recirculating clarified effluent water to the influent side of a biological filter has been developed in order to overcome the low loading problem. Recirculation permits greater pumping flow rates through the filter, or in the case of intermittent filter dosing, longer pumping cycles. This permits applied wastewater to more fully initially flood the surface of the filter insuring good distribution of the wastewater in contact with the filter.

Recirculation also increases the total quantity of atmospheric oxygen transferred to the applied wastewater. Transfer of oxygen from air to water is via the process of diffusion. This occurs when the applied water is spreading in a thin film over the filter aggregate. If water is recirculated three or four times through the filter, the opportunity for such diffusion to take place is multiplied threefold or fourfold. In the case of a continuously flowing filter (e.g. trickling filter) the filter is continuously wetted, but the flow rate is increased by recirculation. It would appear that the rate of oxygen absorption is a function of the liquid flux over the filter medium. The increase in flow rate thereby aids oxygen transfer.

Biological processes produce waste solids in the form of sludge, which consists of dead organisms which have been stripped off of the filter medium. Rock filters, which tend to be run at relatively high hydraulic loading rates, rely on hydraulic sheer to remove these excess organisms, which are subsequently settled out in a post settling tank. Sand filters generally are subject to biological buildup mainly in the top portion of the filter. In municipal wastewater treatment plant practice, which loads the filters with approximately ten gallons/day/sq. ft. of raw wastewater, the filters operate for several months at which time the top inch or so of the filter is generally removed. If the filter is operated at a lower raw sewage loading rate, on the order of one gallon/day/sq. ft., which is the preferred embodiment for the present invention, the growth rate of the organisms is so low that biological solids production is minimal. The dead organisms undergo a process known as autolysis, wherein they break down and are reutilized for food further down in the filter. For example, this phenomenon occurs underneath a properly operating septic system disposal field, which can have a useful life of between 20-50 years.

It is in such an application as the one just described having low hydraulic loading rates that recirculation becomes very important in order to insure adequate wetting of the filter medium.

The present invention is therefore useful as a low flow rate, low maintenance system that will provide a high degree of treatment with nitrogen removal without the need for a skilled operator. The recirculation feature is utilized because operation of numerous slow filtration installations have failed to produce adequate nitrification, although general clarification of the wastewater has been achieved. In the present invention, wastewater exiting the nitrification bed flows through the flow splitting device where a preselected portion of the flow is returned to the nitrification bed. The balance passes by gravity to an upflow denitrification chamber. This reactor is filled with a mixture of sulfur briquettes and limestone. The mixture ranges from 25% to 75% by weight sulfur, and from 25% to 75% by weight limestone, based upon the total weight of the mixture. Preferably, the mixture is 50% by weight limestone and 50% by weight sulfur, based upon the total weight of the mixture. A population of autotrophic sulfur oxidizing bacteria, *Thiobacillus denitrificans*, is capable of using oxygen bound up in the nitrate molecule as a source of oxygen for oxidizing the sulfur. The reaction is as follows:

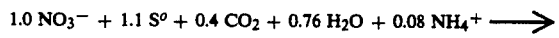

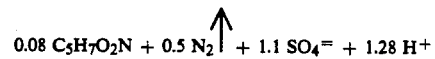

Neglecting cell synthesis:

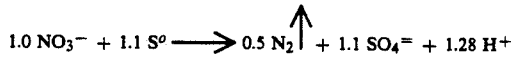

Per Lawrence, A.W., JWPCF, Ca. 1979

The above equation shows that in addition to consuming sulfur, the reaction also produces acid. This is the reason for buffering the reactor with limestone which neutralizes the acid as it is produced. This reaction is as follows:

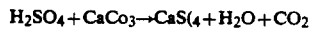

EXAMPLE

The present invention will now be further illustrated by reference to the following example, which is not to be deemed limitative of the present invention in any manner thereof.

The denitrification (subsurface) system is used to treat 14,968 gpd of domestic wastewater. In order to ensure successful operation of the process, the process includes a recirculation apparatus in the system as built.

The system includes the following basic components:
1. Six septic tanks (12' diameter×7' deep);
2. Pumps—four submersible pumps discharging into four force mains;
4. Force mains—four;
5. Nitrification fields—four, each approximately 3,780 square feet. Each field served by its own pump and force main. Each field contains 4" perforated pipe distribution and collection manifolds.
6. Collection manholes—one for each nitrification field;
7. Effluent collection line—standard 6" PVC piping;
8. Denitrification filters—sulfur and limestone—two 12-foot diameter cells;
9. Disposal pools—10-foot diameter leaching pools.

The additions for recirculation are as follows:
1. Diversion manhole—located between final collection manhole and denitrification chambers.
2. Splitter box—located in diversion manhole—will divide filter effluent into two streams. Ratio of flows will be constant and adjustable by means of removable weir plates.
3. Return line—standard 6" PVC piping with manholes at maximum separation of 400-foot, 2" fall per manhole.

The spitter box includes a central influent chamber, preferably rectangular, with removable V-notch weir inserts at either end. Flow through a V-notch weir is proportional to the tangent of the half-angle. By selecting the angle of the two weirs, and cutting the plates so that both weirs are at the same elevation, virtually any desired flow ratio can be maintained.

For example, if a 3:1 split is desired at a flow of 100 GPM, stream 1=75 gpm; stream 2=25 gpm, wherein stream 1 flows through line 36 to pump 34, to field 20, wherein stream 2 flows through line 52 to chamber 50. The design proposes a weir depth of 6". If an operating head is 4 inches (0.33 feet), then:

$$Q_1 = 75 \text{ gpm} = 0.167 \text{ cfs}$$

$$Q = 2.5 \tan \frac{\theta}{2} h^{5/2}$$

$$0.167 = 2.5 \tan \frac{\theta}{2} (0.33)^{5/2}$$

$$\tan \frac{\theta}{2} = 1.07$$

$$\frac{\theta}{2} = 46.9 \text{ degrees } \theta = 93.8°$$

Using a standard 90° weir for recirculation, the resulting H=0.338 ft =4.07"

$$Q_2 = 25 \text{ gpm} = 0.056 \text{ cfs}$$

$$0.056 = 2.5 \tan \frac{\theta}{2} (0.338)^{5/2}$$

$$\tan \frac{\theta}{2} = 0.335$$

$$\frac{\theta}{2} = 18.5°$$

$$\theta = 37° \text{ for discharge weir}$$

The splitter box is fabricated from aluminum. All chambers will have standard O. D. pipe stubs. Conventional rubber compression couplings are used.

The pump controls start each pump in turn, and dose each field in turn. Once recirculation flow begins to return to the nitrification field (wet well), pump running times will increase. The running time is estimated by:

$$\frac{\text{Volume difference between control floats } (\Delta V)}{\text{Pump Discharge} - \text{flow in}}$$

The volume difference has a $\Delta V$ original design for this project showed of 540 gallons and a pump discharge of 100 gpm. At average input flow of 10.3 gpm initially, running time would be $$\frac{540 \text{ gallons}}{100 \text{ gpm} - 10.3 \text{ gpm}} = 6.02 \text{ minutes}$$

Volume pumped = 6.02 × 100 gpm = 602 gallons

The estimated travel time for recirculation flow back to the nitrification field or wet well is 4.8 minutes (at 2 fps). This means that, in one embodiment, recirculation flow will begin to arrive before the pump shuts off, stretching out the cycle. If recirculation flow is treated as having the same flow pattern as the pumped flow, the following cycles occur:

Initial drawdown of wet well
= 4.8 minutes (100 gpm − 10.4 gpm)
= 430 gallons

Volume remaining = 540 − 430 = 100 gallons

Net drawdown rate after return flow starts:
100 gpm − 10.4 − 75 = 14.6 gpm $$\text{Remainder of cycle} = \frac{100 \text{ gallons}}{14.6 \text{ gpm}} = 7.53 \text{ min.}$$

Total volume pumped =
100 gpm (4.8 + 7.53 minutes) = 1,233 gallons

Raw sewage pumped = 540 gallons (initial charge) + (4.8 + 7.53) (10.4) = 668 gallons Recirculation pumped
= (75 gpm) (7.53 minutes) = 565 gallons After the pump shuts off, recirculation flow continues for 4.8 minutes at 75 gpm:

4.8 × 75 = 360   gallons 4.8 × 10.4 = 49.9 gallons new flow
             409.0 gallons in wet well when recirculation stops -continued $$\text{Additional time required to fill well} = \frac{540 - 409.9}{10.4} = 12.5 \text{ minutes}$$

The pump again runs for 4.8 minutes, recirculation flow starts, and the pump runs another 7.53 minutes.

|  | Raw | Recirculation | Total |
|---|---|---|---|
| Initial charge | 180 | 360 | 540 |
| Inflow first 4.8 minutes | 49.9 | 0 | 49.9 |
| Inflow next 7.53 minutes | 78.3 | 565 | 643 |
| Total | 308.2 | 925 | 1,233 |

This table shows that the preferred recirculation ratio of 3:1 is achieved once recirculation flow begins.

If the desired volume/dose is 600 gallons, however, the wet well differential must be adjusted.

Where lag time causes a delay of recirculation flow during the pumping cycle, running time can be estimated from the following:

cycle time = lag time +

$$\frac{\text{wet well storage volume} - \text{volume pumped during lag period}}{\text{pump output} - \text{influent flow} - \text{recirculation flow}}$$

$$t = t_{lag} + \frac{\Delta V - t_{lag}(Q_{pump} - Q_{in})}{Q_{pump} - Q_{in} - Q_R}$$

multiplying out, $$t = \frac{\Delta V - Q_R(t_{lag})}{Q_{pump} - Q_{in} - Q_R}$$

If 600 gallons is the desired dose, solve for $\Delta V$:

$$t = \frac{600}{100} = 6 \text{ minutes}$$

$$\Delta V = 6(100 - 10.4 - 75) + 75(4.8) = 6(14.6) +$$

$$75(4.8) = \Delta V = 447.6 \text{ gallon}$$

It may occur that the underflow rate from a filter bed does not reach inflow rate instantaneously, and that it will continue for some time after the pump shuts off. The actual response time will depend on the properties of the filter bed. The combined filter discharge will be a sinusoid or triangular wave varying about the average flow rate. The total recirculation flow during a time interval can be determined since it will be equal to the raw sewage flow times the recirculation ratio. As shown in the table previously, $$10.4 \text{ gpm avg. flow} \times 60 = 624 \text{ gallons}$$

$$Q_r(t) = 3 \times 624 = 1,872 \text{ gallons}$$

$$\text{Avg. } Q_r = \frac{1,872}{60} = 31.2 \text{ gpm}$$

The underflow can be approximated as an average flow rate. Treating this as a constant flow once steady state operation is achieved, storage required is calculated as follows:

$$\text{Desired pumping time} = \frac{V_{pumped}}{Q_{pump}} = \frac{600}{100} = 6 \text{ minutes}$$

-continued $$\text{Pumping time also} = \frac{\Delta V}{Q_{pump} - Q_{raw} - Q_{recirc}}$$

so, $$\frac{V_{pumped}}{Q_{pump}} = \frac{\Delta V}{Q_{pump} - Q_{raw} - Q_{recirc}}$$

$$\Delta V = V_{pumped} \times \frac{Q_{pump} - Q_{raw} - Q_{recirc}}{Q_{pump}} =$$

$$600 \times \frac{100 - 10.4 - 31.2}{100} = 350.4 \text{ gallons}$$

The actual desired dose per bed at one dose/hour =

$$\frac{14,968 \text{ gpd}}{(24 \text{ doses/day})(4 \text{ beds})} =$$

156 gallons septic tank effluent plus 3(156) = 468 gallons recirculation = 624 gallons $$\Delta V = 624 \times \frac{100 - 10.4 - 31.2}{100} = 364.4 \text{ gallons}$$

OPERATION DURING A PEAK PERIOD

Peak flow is determined as $10.4 \times 4 = 41.6$ gpm. During a one-hour interval, the following flows result:

| Raw sewage: | 41.6 gpm average<br>41.6 × 60 =<br>2,496 gallons |
|---|---|
| Recirculation: | 41.6 gpm × 3 =<br>124.8 gpm average<br>124.8 × 60 =<br>7,488 gallons total |
| Total flow is: | 7,488 + 2,491 =<br>9,984 gallons |
| Average flow rate into nitrification field: | $\frac{9,984}{60} = 166.4$ gpm |
| Pump running time: | 99.8 minutes per hour = one pump running continuously, another for 39.8 minutes/hour |

After the peak flow rate has been established, the average recirculation rate of 124.8 gpm was used for determining storage:

$$\text{Cycle time at 200 gpm out} = \frac{364.4 \text{ gallons}}{200 - 41.6 - 124.8} = 10.85 \text{ minutes}$$

Volume pumped = 2,170 gallons

It was decided to use two 100 gpm pumps rather than one 200 gpm pump for peak flows. 100± gpm pumps were used for the following reasons:

1. storage required for 624 gallon dose at average flow will increase to $624/200 \times (200 - 10.4 - 31.2) = 494$ gallons. This will in turn result in a high flow running time of $$\frac{494}{200 - 41.6 - 124.8} = 14.7 \text{ minutes}$$

and a dose of 2,940 gallons to one bed, versus (10.43)(200) = 2,170 gallons to two beds. Serial operation of small pumps therefore allows more uniform dosing.

2. During peak flow periods, there are two possible pump sequences:

TYPE 1: A + B, C + D, A + B, C + D, and so on.
or
TYPE 2: A + B, B + C, C + D, D + A where the first pump in a combination is the lead. Sequence Type 2 is more common. Under sequence Type 1, a bed will receive about 1,100 gallons with a 15± minute rest period. Under Type 2, a bed will receive 2,200 gallons with a 30 minute rest period. Dosage is transported through an approximately ½-inch pipe for Type 1, and through a 1-inch pipe for Type 2.

It has been observed that actual sewage flow is large relative to the pumping rate. If the embodiment were for a single 3,720 gpd bed, average influent rate would be only 2.6 gpm, and peak rate would be 10.4 gpm. An average flow dose of 624 gallons would increase to between 900 and 1,200 gallons during peak flows, and extra pumping would not be needed.

Dosing criteria has been developed for the addition of recirculation capability to a subsurface nitrification-denitrification system. Other embodiments include providing a recirculation splitter box, the addition of other recycle lines, and a change in wet well operating levels (in order to achieve desired cycle time). The splitter box uses removable weirs which permit both changes in the recirculation ratio and return to conventional operation.

In the present system, the response of the filter bed to the applied flow is based upon having an unsaturated hydraulic conductivity that remains constant throughout the bed or can be represented by an average value.

It has been determined that the hydraulic response, once a bed has been wetted and allowed to drain to the point of no flow, is a decaying exponential. Discharge rates that might result from K values reasonably expected from the standard filter bed mix show that:

$Q_{out}$ at time $t = Q(t) = Q_{in}(1 - e^{Kt/vZ})$ where $K$ = hydraulic conductivity, gpm/ft$^2$ $Z$ = bed depth, for example, 3.5 feet $v$ = storage, gallons/ft$^2$ inch $v$ = 0.62 gallons/ft$^2$ inch on top of the bed, but
= 0.62 (porosity) inside the bed If flow to bed stops at $t = t_1$,
$Q(t > t_1) = Q(t_1) e^{-K(t-t_1)/vZ}$ 1) Darcy's Law: V=K h/z applied head
2) Saturated K>unsaturated K
3) When no flow is draining out of bed, h must be zero
4) Look at effect of various K's on fluid holdup
5) Flow per unit area, q=Q/A
6) Head must build up in the form of accumulated liquid within the bed. When this happens, the soil tension decreases, and water will move.
7) In consistent units stored water=A·h overall, a·h for unit area.

For non-consistent units, e.g., gallons/ft$^2$ inch, a conversion constant is required.

$$\frac{1 \text{ ft}}{12 \text{ inches}} \times \frac{7.48 \text{ gallons}}{\text{ft}^3} = \frac{0.62 \text{ gallons}}{\text{ft}^2 \text{ inch}}$$

this is represented as $v$

8) The expression relating flow through and out of the bed to applied head is as follows:

$$Q_{in} - Q_{out} = Av \frac{dh}{dt}$$

$$Q_{out} = \frac{KAh}{Z}$$

If $Q_{in}$ is constant (say a pump discharge) over a time interval, $$Q_{in} - \frac{KAh}{Z} = Av \frac{dh}{dt}$$

rearranging, $$\frac{dh}{Q_{in} - \frac{KAh}{Z}} = \frac{dt}{Av}$$

integrating, $$\frac{-Z}{KA} \ln\left(Q_{in} - \frac{KAh}{Z}\right) = \frac{t}{vA} + C$$

note, $$Q_{in} - \frac{KAh}{Z} = Q_{in} - Q_{out}$$

at $t = 0$, $Q_{out} = 0$, $h = 0$ therefore, $$\frac{-Z}{KA} \ln Q_{in} = C$$

$$\frac{-Z}{KA} \ln (Q_{in} - Q_{out}) = \frac{t}{Av} - \frac{Z}{KA} \ln Q_{in}$$

$$\frac{Z}{KA} \ln Q_{in} - \frac{Z}{KA} (Q_{in} - Q_{out}) = \frac{t}{Av}$$

$$\frac{Z}{K} \ln \frac{Q_{in}}{(Q_{in} - Q_{out})} = \frac{t}{v}$$

$$\frac{Z}{K} \ln \frac{(Q_{in} - Q_{out})}{Q_{in}} = \frac{-t}{v}$$

$$\ln \frac{Q_{in} - Q_{out}}{Q_{in}} = \frac{-K}{Z} \cdot \frac{t}{v}$$

$$\frac{Q_{in} - Q_{out}}{Q_{in}} = e^{-Kt/Zv}$$

$$Q_{in} - Q_{out} = Q_{in} e^{-Kt/Zv}$$

$$Q_{out} = \frac{Akh}{Z} = Q_{in}(1 - e^{-Kt/Zv})$$

also, dividing by $A$, $$q_{out} = \frac{Kh}{Z} = q_{in}(1 - e^{-Kt/Zv})$$

Medium-sized sand has a hydraulic conductivity between 10 and 250 ft/day. Preferably, K ranges from 25 ft/day up to 50 ft/day.

Units: $25 \text{ ft/day} \times 7.48 \frac{\text{gal}}{\text{ft}^3} \times \frac{1 \text{ day}}{1440 \text{ min.}} =$ $0.13 \text{ gal/min-ft}^2 \text{ (gpm/ft}^2\text{)}$ $v = 0.62 \text{ gallon/ft}^2\text{-inch}$ For the case of $A = 3,750 \text{ ft}^3$ Pump dosing rate = 100 GPM $Q_{out} = \frac{KAh}{Z} = Q_{in}(1 - e^{-Kt/(3.5)(0.62)})$ $Q_{out} = 100 (1 - e^{-0.13t/(3.5)(0.62)})$ $Q_{out} = 100 (1 - e^{-0.06t})$ For $K = 50$ ft/day = 0.26 GPM/ft$^2$ $Q_{out} = 100 (1 - e^{-0.1197t})$ For subsidence of flow after pump shuts off:

$Q_{in} - Q_{out} = vA \frac{dh}{dt}$ $Q_{in} = 0$, so $-Q_{out} = vA \frac{dh}{dt} = \frac{-KhA}{Z}$ $\frac{dh}{h} = \frac{-KAdt}{vAZ} = \frac{Kdt}{vZ}$ $\ln h = \frac{-Kt}{vZ} + C$ at $t = 0$, $h = h_0$ If pumping starts at t=0, and stops at $t_1$, with $Q_1$ leaving the filter of the nitrification field 20, then the flow leaving the filter after shutoff $(t > t_1)$ is $Q = Q_1 e^{-K(t-t1)/vZ}$ For K = 25/ft day = 0.13 gpm/ft$^2$, $v = 0.62 \frac{\text{gallon}}{\text{ft}^2 \text{ inch}}$

| $Q_P = 100$ gpm | |
|---|---|
| Time | Fill $Q_{out}$ gpm |
| 0 | 0 |
| 1 | 5.8 |
| 2 | 11.3 |
| 3 | 16.4 |
| 5 | 25.9 |
| 7 | 34.2 |
| 10 | 45 |
| 15 | 59.3 |
| 20 | 69.8 |
| 25 | 77.6 |
| 30 | 93.4 |
| 45 | 192 |
| 60 | 200.4 |

| For K — 50 ft/day = 0.26 gpm/ft$^2$ | |
|---|---|
| $Q_P = 100$ gpm | |
| Time | Fill $Q_{out}$ gpm |
| 0 | 0 |
| 1 | 11.3 |
| 2 | 21.3 |
| 3 | 30.2 |
| 5 | 45 |
| 7 | 56.7 |
| 10 | 69.8 |
| 15 | 83.4 |
| 20 | 90.4 |
| 25 | 95 |
| 30 | 97.2 |

Case 2:

Storage treated as internal, $v^1 = v\epsilon$ $\epsilon$ = porosity, for example, 0.3

$Q = Q_p (1 - e^{Kt/v\epsilon Z})$

| For K = 25 ft/day, $Q = Q_P(1 - e^{-0.199t})$ | |
|---|---|
| Time | Fill |
| 0 | 0 |
| 1 | 18.1 |
| 2 | 32.9 |
| 3 | 45 |
| 5 | 63 |
| 7 | 75 |
| 10 | 86.4 |
| 15 | 95 |
| 20 | 98.1 |
| 25 | 99.3 |

| For K = 50 ft/day, $Q = Q_Q(1 - e^{-0.399t})$ | |
|---|---|
| Time | Fill |
| 0 | 0 |
| 1 | 32.9 |
| 2 | 55 |
| 3 | 69.8 |
| 5 | 86.4 |
| 7 | 93.9 |
| 10 | 98.2 |

In another embodiment, the denitrificaiton chamber 50 is lowered to allow for a two-foot-deep gravel bed below the manifold pipe in the bottom of the chamber. This will provide a storage area for any fines that settle to the bottom, which will help prevent the manifold pipe from clogging.

In another embodiment the sulfur media would be changed from ¾" chunks to sulfur bricks known as sulfur solid "ORM-C, UN1350" as distributed by S and S Chemical Co. for the denitrification chamber 50.

In a further embodiment, a second denitrification chamber could be provided with a methanol treatment system, in addition to the first denitrificaiton chamber based upon sulfur and limestone for removing nitrates.

In another embodiment, the recycle line 36 and 30 is a 6" diameter PVC at 0.50% slope with 2" drops through the manholes.

While several embodiments of the present invention have been shown and described, it is to be understood that many changes and modifications may be made thereunto without departing form the spirit and scope of the invention as defined in the appended claims.

What is claimed is:

1. A process for the microbiological nitrification and the microbiological denitrification of wastewater consisting of the steps of:
   (a) removing settleable solids form the waste-water in a settling tank zone, producing a wastewater output and transporting this output to a fixed-bed nitrification field zone;
   (b) nitrifying the wastewater output form the settling tank zone in the fixed-bed nitrification field zone by conversion of nitrogen, first to nitrite and then nitrate, by aerobic microbiological activity, producing a wastewater flow; and transporting the wastewater flow to a separation zone;
   (c) splitting the wastewater flow from the nitrification field zone into a first stream and a second stream in said separation zone;

(d) recycling back the first stream to the nitrification field zone, such that a sufficient amount of the wastewater is recycled back into the nitrification filed zone so that there will be sufficient wetting of all the nitrification field zone in order to assure a continuous microbiological activity to act upon the nitrogen in the wastewater; and transporting the second stream for denitrification to a denitrification chamber zone;

(e) denitrifying the wastewater in the second stream in a fixed-bed denitrificaiton chamber zone with a microbiological denitrification media; and (f) disposing of wastewater form the denitrification chamber zone through a discharge system.

2. The process according to claim 1, wherein in step (a) said transporting of the wastewater output is by gravity feed to the nitrification field zone.

3. The process according to claim 1, wherein in step (d) said recycling back of the first stream is by pump pressure feed to the nitrification field zone.

4. The process according to claim 1, comprising merging the wastewater output of step (a) and the first stream of step (c) together in a pump pressure zone to produce a merged stream; and then recycling back the merged stream by pump pressure feed to the nitrification field zone.

5. The process according to claim 1, wherein the weight ratio of the first stream to the second stream in step (c) ranges from 2 to 10:1.

6. A process for the microbiological nitrification and the microbiological denitrificaiton of wastewater consisting of the steps of:

(a) removing settleable solids form the wastewater in a settling tank zone, producing a wastewater output and transporting this output to a fixed-bed nitrification filed zone;

(b) nitrifying the wastewater output form the settling tank zone in the fixed-bed nitrification filed zone by conversion of nitrogen, first to nitrite and then nitrate, by aerobic microbiological activity, producing a wastewater flow; and transporting the wastewater flow to a separation zone;

(c) splitting the wastewater flow from the nitrification filed zone into a first stream and a second stream in said separation zone;

(d) recycling back the first stream to the nitrification filed zone, such that a sufficient amount of the wastewater is recycled back into the nitrification filed zone so that there will be sufficient wetting of all the nitrification field zone in order to assure a continuous microbiological activity to act up the nitrogen in the wastewater; and transporting the second stream for denitrification to a denitrificaiton chamber zone;

(e) denitrifying the wastewater in the second stream in a fixed-bed denitrification chamber zone with a microbiological denitrification media;

(f) disposing of wastewater from the denitrification chamber zone through a discharge system; and (g) controlling a liquid level in the nitrification filed zone by measuring the liquid level therein, and comparing this measuring with a reference value and by adjusting the recycling of step (d) to vary the amount of the first stream recycled back to the nitrification filed zone to achieve this reference value.

7. The process according to claim 6, wherein once the percent of recycled waste-water has stabilized due to achieving steady state operation, the controlling of step (g) is terminated.

8. The process according to claim 6, wherein the controlling step is carried out continuously.

9. A process for the microbiological nitrification and the microbiological denitrificaiton of wastewater consisting of the steps of:

(a) removing settleable solids from the waste-water in a settling tank zone, producing a wastewater output and transporting this output to a fixed-bed nitrification filed zone;

(b) nitrifying the wastewater output from the settling tank zone in the fixed-bed nitrification filed zone by conversion of nitrogen, first to nitrite and then nitrate, by aerobic microbiological activity, producing a wastewater flow; and transporting the wastewater flow to a separation zone;

(c) splitting the wastewater flow from the nitrification field zone into a first stream and a second stream in said separation zone;

(d) recycling back the first stream to the nitrification filed zone, such that a sufficient amount of the wastewater is recycled back into the nitrification filed zone so that there will be sufficient wetting of all the nitrification filed zone in order to assure a continuous microbiological activity to act upon the nitrogen in the wastewater; and transporting the second stream for denitrification to a denitrification chamber zone;

(e) denitrifying the wastewater in the second stream in a fixed-bed denitrification chamber zone with a microbiological denitrification media;

(f) disposing of wastewater from the denitrification chamber zone through a discharge system;

(g) controlling a liquid level in the nitrification filed zone by measuring the liquid level therein, and comparing this measuring with a reference value and by adjusting the recycling of step (d) to vary the amount of the first stream recycled back to the nitrification filed zone to achieve this reference value; and (h) wherein if the inflow form the settling tank zone into the nitrification filed zone is very low, then substantially all of the liquid from the nitrification filed zone leaves said separation zone as the first stream which is recycled back to the nitrification filed zone.

10. A process for the microbiological nitrification and the microbiological denitrification of wastewater consisting of the steps of:

(a) removing settleable solids for the wastewater in a settling tank zone, producing a wastewater output and transporting this output to a fixed-bed nitrification field zone;

(b) nitrifying the wastewater output form the settling tank zone in the fixed-bed nitrification filed zone by conversion of nitrogen, first to nitrite and then nitrate, by aerobic microbiological activity, producing a wastewater flow; and transporting the wastewater flow to a separation zone;

(c) splitting the wastewater flow from the nitrification filed zone into a first stream and a second stream in said separation zone;

(d) recycling back the first stream to ht nitrification filed zone, such that a sufficient amount of the wastewater is recycled back into the nitrification filed zone so that there will be sufficient wetting of all the nitrification field zone in order to assure a continuous microbiological activity to act upon the nitrogen in the wastewater; and transporting the second stream for denitrification to a denitrification chamber zone;

(e) denitrifying the wastewater in the second stream in a fixed-bed denitrification chamber zone with a microbiological denitrificaiton media;

(f) disposing of wastewater from the denitrification chamber zone through a discharge system;

(g) controlling a liquid level in the nitrification field zone by measuring the liquid level therein, and comparing this measuring with a reference value and by adjusting the recycling of step (d) to vary the amount of the first stream recycled back to the nitrification field zone to achieve this reference value; and (h) wherein if there is a surge of wastewater from the settling tank zone into the nitrification filed, then substantially all of the liquid which leaves the separation zone leaves as the second stream which is transported to the denitrification chamber zone.

* * * * *